Jan. 28, 1969    R. L. GOWER    3,424,219
COBRA-HEAD SHAPED CONNECTOR HOOK AND METHODS OF USE

Filed Oct. 22, 1965    Sheet 1 of 2

INVENTOR.
ROGER L. GOWER
BY
ATTORNEY

Jan. 28, 1969　　　　R. L. GOWER　　　　3,424,219
COBRA-HEAD SHAPED CONNECTOR HOOK AND METHODS OF USE

Filed Oct. 22, 1965

INVENTOR.
ROGER L. GOWER
BY
ATTORNEY

United States Patent Office 3,424,219
Patented Jan. 28, 1969

3,424,219
COBRA-HEAD SHAPED CONNECTOR HOOK AND METHODS OF USE
Roger L. Gower, P.O. Box 65, Canaan, Maine 04924
Filed Oct. 22, 1965, Ser. No. 501,166
U.S. Cl. 152—241                                                    6 Claims
Int. Cl. B60c 27/08; F16g 15/04

ABSTRACT OF THE DISCLOSURE

This invention relates to a detachable connecting device comprising an open throat hook, a shank, and a base member permitting turning of the device after the fashion of a swivel, with the end portion of the hook being flattened and flared in the form of a cobra head and having radii upon the periphery thereof adjacent the shank to facilitate assembly of the connector by insertion of the cobra head through a link as of chain, and to minimize the possibility of accidental disassembly of the unit from the chain.

---

This invention relates to new and useful improvements in hook connectors, which may be used in various combinations, such as, for example, connecting side chains to traction units or chains for vehicle wheels.

One of the objects of the invention is to provide a detachable connector, whereby a traction device or tire chain can be assembled or repaired without tools.

A further object of the invention is to provide a hook connector which may be easily inserted into a link and which resists detachment through jostling of the chain or a loose fit of the hook in the link.

An additional object is to provide a flattened, cobra-like head on the hook, which will lie in the plane of the link into which it is inserted; and in the event of excessive stress that tends to open the hook and straighten the shank, said flattened head will nevertheless provide a reserve means for holding the connector and the link together.

A further object is to provide a bearing surface at one side of the base of the cobra-head tip, such surface forming a radius to permit easy insertion of the head through the link and thus make possible the use of a larger head than would be feasible without said bearing radius. If desired, both sides may be provided with such bearing surfaces forming radii.

Another object of this invention is to provide means whereby standard sizes of chain may be combined, by the use of the connector hooks herein set forth, to complete tire chain assemblies.

It is a further object of this invention to provide means whereby the number and spacing of cross-chains in such tire chain assemblies may be varied to suit the desire of the user or the requirements of the job for which tire chains are needed.

An additional object is to provide tire chain assemblies having diagonally placed cross-chains, whereby side slip of the vehicle on a slippery surface is lessened or minimized because of the opposing directions of adjacent segments of the cross-chain element.

A further object of this invention is to provide means whereby a single tire chain assembly can be made which will serve for dual wheels of heavy vehicles, to supplant the present single tire chain assembly for each wheel.

Figure 1:
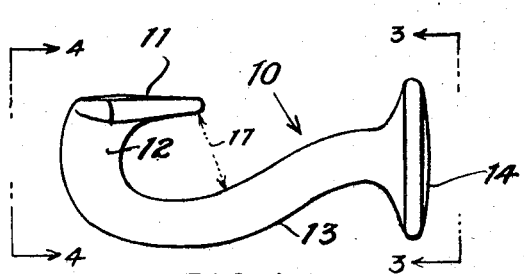
Figure 3:
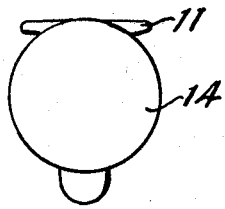
Figure 2:
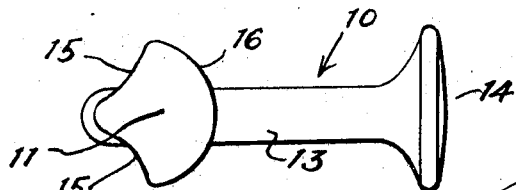
Figure 4:
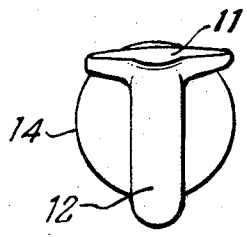
Figure 5:
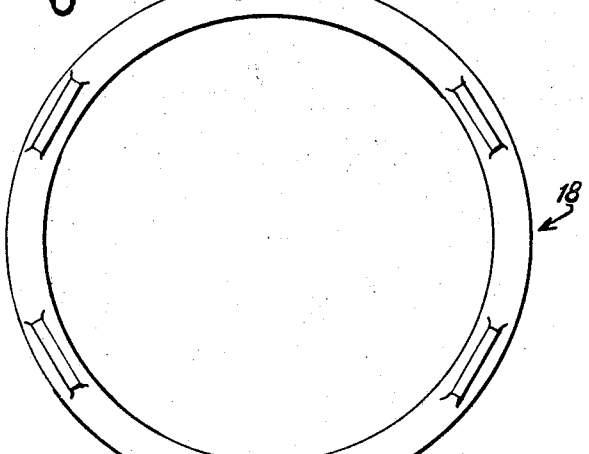
Figure 6:
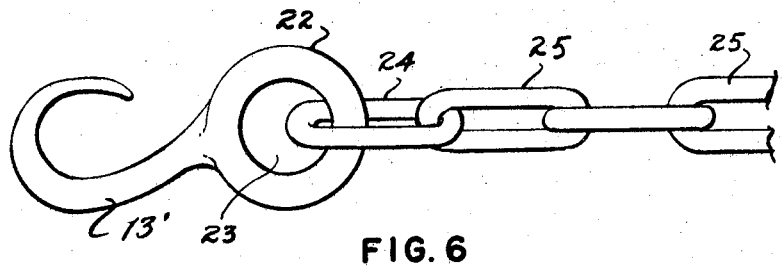
Figure 7:
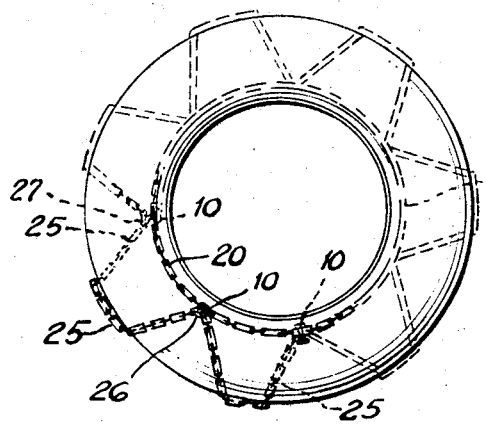
Figure 8:
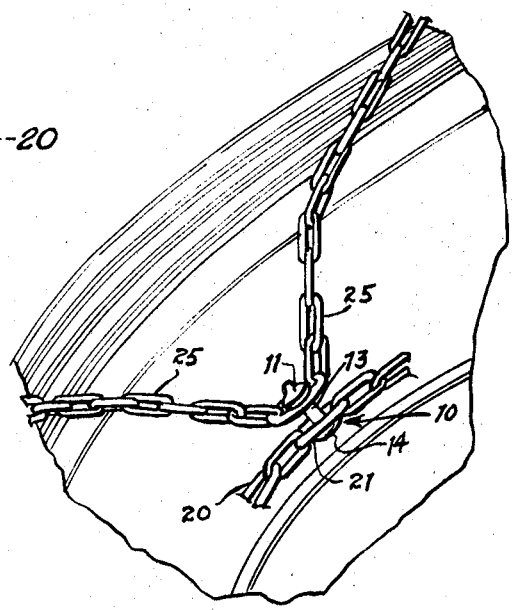

With the above and other objects in view, this invention consists of the novel features, combination and arrangement of parts hereinafter fully described, claimed and illustrated in the accompanying drawings, forming part of this application, in which similar characters of reference indicate corresponding parts in all views, and in which:

FIGURE 1 is a side elevational view of the hook connector;
FIGURE 2 is a top plan view thereof;
FIGURE 3 is an end view of the same, taken on line 3—3 of FIGURE 1;
FIGURE 4 is a view of the opposite end thereof, taken on line 4—4 of FIGURE 1;
FIGURE 5 illustrates a method of attaching a traction device for vehicles to side chains;
FIGURE 6 shows an eye connector hook with cobra-head tip, permanently attached to the end of a length of chain;
FIGURE 7 shows a continuous length of chain attached to side chains and mounted on a wheel; and
FIGURE 8 illustrates the detail of connecting said continuous length at one point to the side chain.

Referring more particularly to FIGURES 1 and 2 of the drawings, the numeral 10 indicates a connector hook having a flattened, cobra-head shaped tip 11 at the end of hook 12, and shank 13 adjacent to and terminating in base 14. Radii 15, 15 are shown at the border of said cobra-head tip adjacent the hook and may be provided either on one side or on both sides, to facilitate insertion of the hook into a link to which it is to be connected, while the flaring contour 16 of said cobra-head tip prevents the hook from being unintentionally disengaged from the link through which it has been inserted. The throat diameter 17 is sufficient to accommodate a link of either nominal size with the diameter of the shank, or a size of link made from stock of the next larger size, thus making the same connector hook suitable for use with more than one size of link.

In FIGURE 3, the base 14 is shown as substantially round, and the outermost points of the cobra-head tip 11 may be seen extending beyond the border of said base.

FIGURE 4 shows a view of the invention from the hook end, with the hook 12, tip 11, and base 14 recedingly positioned.

FIGURE 5 shows the ring section of a tire chain disclosed in my co-pending application, Ser. No. 461,350, filed June 4, 1965, now Patent No. 3,313,335, Apr. 11, 1967, with said ring 18 attached by links 19 to side chain 20 by the connector hook 10. Base 14 of said connector hook is retained in side chain link 21, and the cobra-head shaped tip 11 has been inserted through link 19 attached to the ring section to hold said ring section firmly in position in relation to the side chain.

FIGURE 6 shows an eye hook 22 having an eye 23 at the end of shank 13', permanently attached by means of an end link 24 to a length of chain 25, said end link being threadably connected to said eye of the connector hook.

FIGURE 7 shows chain 25 drawn in successive diagonal placements across the outermost surface of a wheel, being anchored, on the visible side of said wheel, as at point 26, and on the inner side, indicated by the dotted-line chain, at point 27.

In FIGURE 8 there is shown a detail of such anchorage, wherein chain 25 is attached to side chain 20 by hook 10, wherein the base 14 of the connector hook lies on one side of the link 21 of said side chain, and shank 13 projects through said link, permitting the cobra-head shaped tip 11 of the connector to be inserted through a link of the continuous length of cross-chain 25, holding said chain firmly attached to the side chain.

For the purpose of effecting easy and rapid assembly without tools, of a traction device when employing my said ring section of application Ser. No. 461,350 with the invention herein disclosed, two side chains of suitable length may be placed in parallel relationship, and the desired number of ring sections positioned equidistantly from each other between said side chains. Attachment of the ring sections to the side chains is then effected by the use of the cobra-head shaped connector hooks of the present invention, inserted first through links of the side chains at spaced intervals, equal and opposite in the two side chains, and then through the outermost link forming a part of the ring section assembly. When both sides of each ring section have been suitably attached to the side chains, the assembly is ready for installation on the wheel of a vehicle in the conventional manner.

An alternative method of assembly may be accomplished by providing the connector hook of the present invention, having an eye at the shank end thereof, said connector being permanently attached to the said ring section by a forged or welded link, and said cobra-head tip being inserted through the side chain.

A different type of tire chain assembly may be made employing the connector hook of the present invention, wherein a continuous length of chain of suitable size is drawn in successive opposing diagonal positions over the tread of the tire, being attached at alternate points on the two side chains.

For the purpose of economical and rapid assembly of a set of tire chains to fit the wheel of a vehicle, or the dual-wheels, if such are to be provided with such a tire chain assembly, side chains of the proper length may be placed in parallel relationship, and the end of a continuous length of chain, which may be fitted with an eye connector hook at the end thereof, is attached to one of the said side chains by the insertion therethrough of the cobra-head tip of said hook. The continuous length of chain is drawn diagonally across the space between the side chains and is attached to the opposite side chain by means of a connector hook as shown in FIGURE 2 of the drawings forming a part of this application. Said continuous length of chain is then drawn diagonally forward at a uniform angle, to the first of said side chains, and attachment is effected by means of another such connector hook. This procedure is continued until the continuous length of chain, to its bitter end, has been fastened, in segments of uniform length and at uniform angles throughout, between the two side chains, to lie in a uniform zigzag pattern over the tread of the tire on the said wheel.

It is to be understood that the form of the invention herewith shown and described is to be taken as a preferred example of the same, and that various changes in the shape, size and arrangement of parts may be made without departing from the spirit of the invention or scope of the subjoined claims.

What is claimed is:

1. A connector hook having a flattened, cobra-head shape at the tip thereof, said head characterized by a semi-circular tip and a concave radius joining at least one side of the border of the tip to the shank of the hook, and a shank terminating in fastening means adjacent thereto and integral therewith.

2. A connector hook as claimed in claim 1, having bearing surfaces comprising concave radii at the opposite borders of said tip adjacent the hook.

3. A connector hook as claimed in claim 1, wherein said fastening means adjacent said shank comprises a base member of substantially round and flattened contour.

4. A connector hook as claimed in claim 1, wherein said fastening means adjacent said shank comprises an eye.

5. In combination, connector hooks, each having a cobra-head shaped tip, said head characterized by a semi-circular tip and a concave radius joining at least one side of the border of the tip to the hook, and a shank terminating in fastening means and lengths of chain, comprising a tire chain assembly having a pair of side chains and another chain so attached thereto as to be drawn across the tread of a tire on a vehicle wheel in successive opposing diagonal segments of a continuous length, the point between each opposing pair of such segments being attached, by means of said connector hooks, at alternate point on said pair of side chains.

6. An invention as claimed in claim 5, wherein the continuous length of chain is threadably attached to a connector hook at the end thereof, said hook being inserted through a link of said side chain as anchorage for commencement of the cross-tire positioning of said continuous length of chain.

References Cited

UNITED STATES PATENTS

| Re. 14,427 | 1/1918 | Canfield | 152—241 |
| 131,224 | 9/1872 | Paul | 152—242 |
| 2,657,727 | 11/1953 | Peterson | 152—241 |
| 2,770,281 | 11/1956 | Eddy | 152—241 |
| 2,825,381 | 3/1958 | Eddy | 152—241 |

FOREIGN PATENTS 53,413    1/1934    Norway.

ARTHUR L. LA POINT, *Primary Examiner.*

CHARLES B. LYON, *Assistant Examiner.*

U.S. Cl. X.R.

59—93